Aug. 15, 1967 J. T. BARANY 3,336,595

MULTIVIBRATOR DRIVE CIRCUIT FOR A RECORDING HEAD

Filed June 18, 1964 2 Sheets-Sheet 1

INVENTOR
JANOS T. BARANY
BY
Douglas M. Clarkson
ATTORNEY

Aug. 15, 1967 J. T. BARANY 3,336,595

MULTIVIBRATOR DRIVE CIRCUIT FOR A RECORDING HEAD

Filed June 18, 1964 2 Sheets-Sheet 2

INVENTOR
JANOS T. BARANY
BY
Douglas M. Clarkson
ATTORNEY

United States Patent Office 3,336,595
Patented Aug. 15, 1967

3,336,595
MULTIVIBRATOR DRIVE CIRCUIT FOR A RECORDING HEAD

Janos T. Barany, Port Washington, N.Y., assignor to Potter Instrument Company, Inc., Plainview, N.Y., a corporation of New York
Filed June 18, 1964, Ser. No. 376,136
4 Claims. (Cl. 346—74)

This invention relates to a driver circuit for a recording head for the recording of binary information on a magnetized storage medium such as magnetic tape and the like.

This is a continuation-in-part of an application Ser. No. 300,817 filed Aug. 8, 1963, now abandoned.

In the recording of binary information, it is usual to provide a magnetic recording head which will magnetize the recording medium in one direction for recording of one bit state, i.e., "0," and to magnetize the medium in another direction for recording of the other bit state, i.e., "1." A convenient method for this recording is to reverse the current flow through the recording head for recording of the respective bit information. A logical circuit element to accomplish such reversal of current is a flip flop circuit.

However, flip flop circuits, such as conventional transistor flip flops, cannot be used to directly drive the recording head since such heads are of extremely low resistance and act as a short circuit across the flip flop, preventing the buildup of drive voltages on the flip flop. For this reason, the art has utilized flip flops in combination with inverter isolation stages.

It is, therefore, a primary object of this invention to provide an improved driver stage for a recording head.

Advantages of the invention include an improvement in the quality of magnetic recording which permits a reduction in circuit delay time and in a decrease in cost.

Further, in many installations, it is desirable to use a single amplifier for driving a plurality of magnetic recording heads in a timesharing sequence. In such installations, typical of which are computer installations where information is "written" into one of a selected plurality of information storage devices, head selection in response to an actuating signal has been difficult, and an independent amplifier for each head has often been used.

It is, therefore, a further object of this invention to provide an improved driver stage to selectively drive one of a plurality of recording heads in response to a selection signal.

It is still a further object of this invention to provide improved write circuitry for storage of digital information on magnetic tape in response to signal actuation from a signal source.

Figure 1:
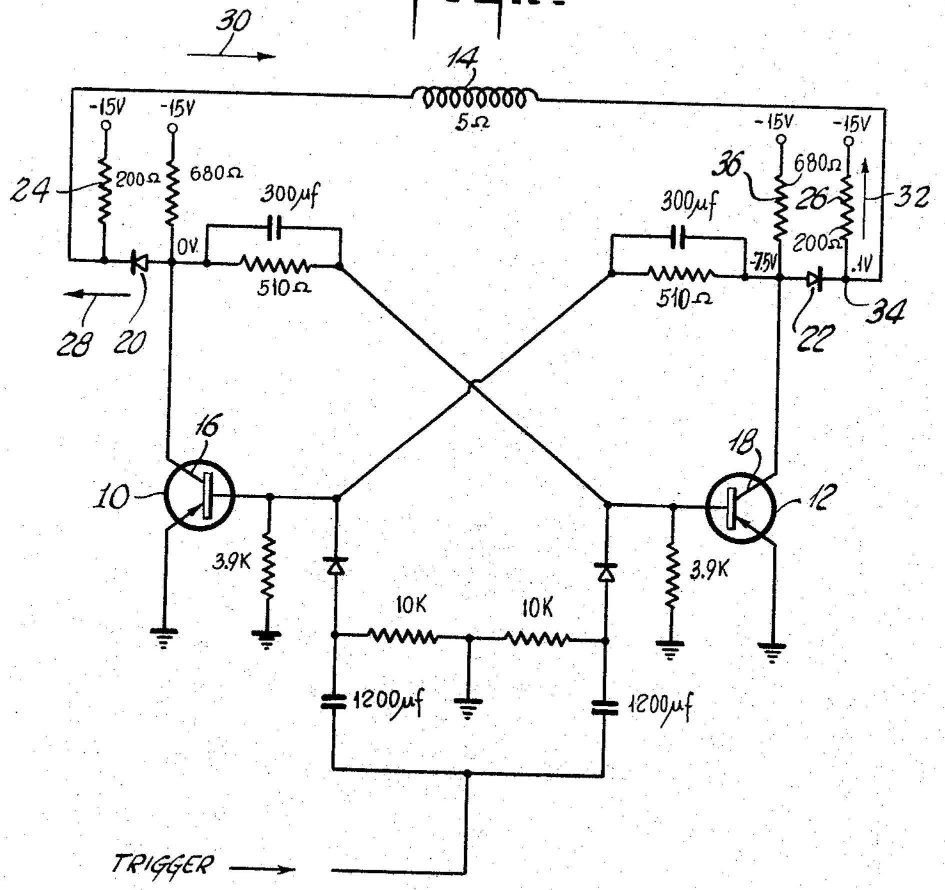
Figure 2:
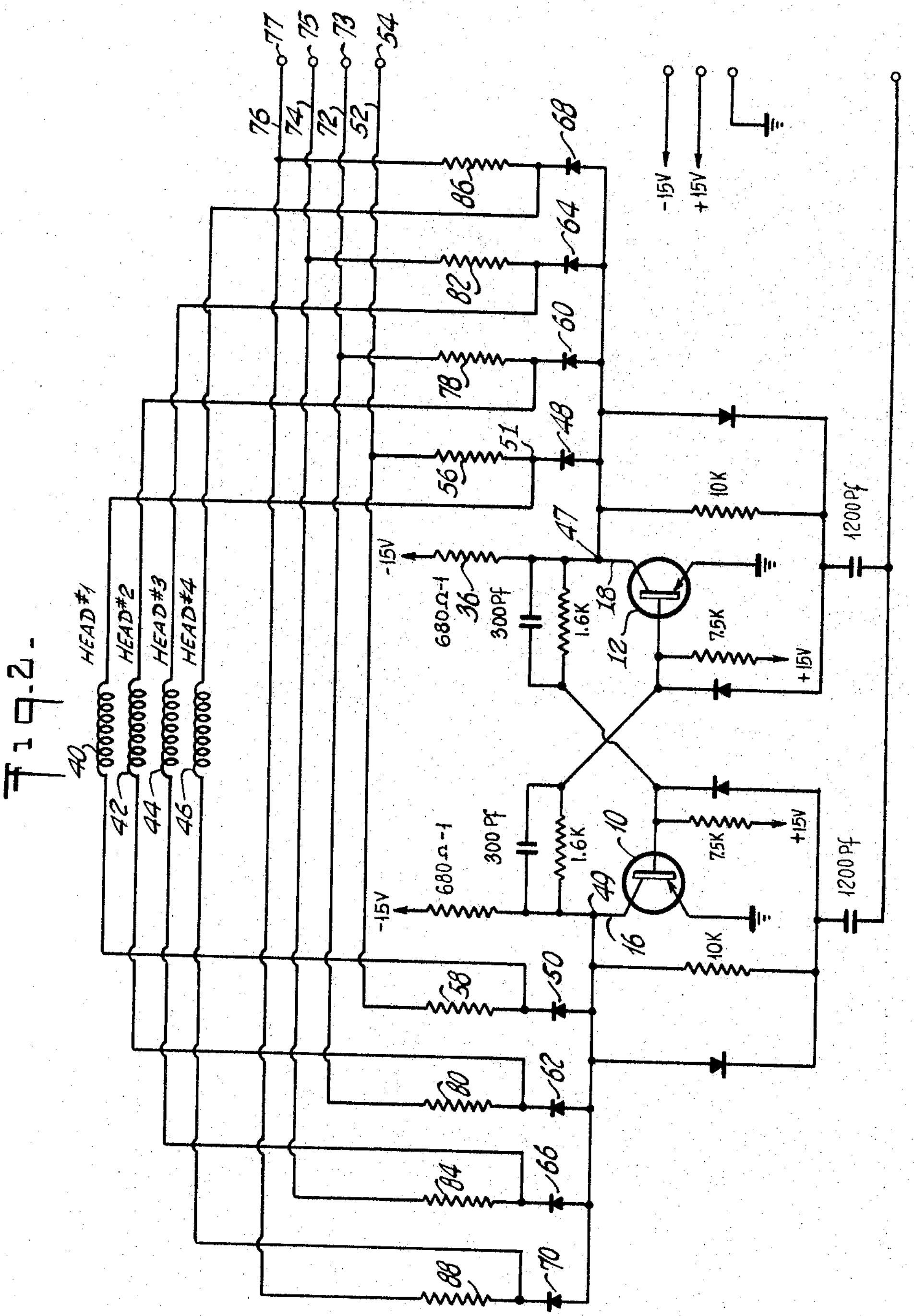

Other objects and advantages of the invention will be pointed out hereinafter in the detailed description of the invention, which may best be understood by reference to the accompanying figures, of which:

FIG. 1 is a schematic diagram of a driver stage in accordance with the present invention; and FIG. 2 is a schematic diagram of a driver stage in use with a plurality of heads.

In FIG. 1, there is shown a flip flop comprising transistors 10 and 12 which are coupled in a conventional flip flop circuit. The coil 14 of the recording head is coupled across the collectors 16 and 18 of respective transistors 10 and 12 through diodes 20 and 22 respectively. Resistors 24 and 26 are respectively coupled between the anodes of diodes 20 and 22 and the source voltage of −15 volts.

The diodes and the associated anode resistors serve to isolate the flip flop from the current drain of the low resistance recording head 14 which may, for example, comprise a resistance of only 5 ohms as follows:

As shown, transistor 10 is fired clamping the collector to ground so that it will go to 0 volt. Transistor 12 is, thus, cut off and its collector will go to about −7½ volts, as indicated. With collector 16 at 0, current will flow as indicated by arrow 28, approximately half of which current will flow through the recording head as indicated by arrow 30 and through resistor 26 as indicated by arrow 32. The other portion of the current will flow through resistor 24. Since the drop through the head 14 is very small in comparison with the drop in resistance 26, the junction 34 will go negative by only a small amount, as for example, one-tenth of a volt. However, since the collector of transistor 12 is at −7½ volts, the diode 22 will isolate the collector from the junction 34, preventing drawing of current through the collector resistor 36 thereof and dropping the collector current below the necessary drive voltage for the transistor. The values of the resistance of resistors 24 and 26 are selected to determine the proper magnitude of current flowing through the coil 14 for a given power supply voltage to saturate the magnetic storage medium. The power supply voltage should be large enough to assure a fast enough current rise time in the coil 14. The current rise time in the coil 14, on the other hand, is governed by the ratio of the inductance of the coil 14 and the resistance of respective resistor 24 or 26 ($L/R$) depending upon direction of current flow.

Similarly, when the flip flop is triggered so that the transistor 12 conducts, the diode 20 will serve as an isolation preventing the current drain through the recording head from pulling the necessary drive voltages from transistor 10 of the flip flop.

As illustrated, PNP transistors are employed and the source polarities are established for such type transistor. For other types, polarities of source and signals must be reversed.

In FIG. 2, there is shown a circuit diagram for using a single drive circuit to drive a plurality of magnetic recording heads located on different magnetic tape transports, or similar equipments such as magnetic disc random access memory units, etc., in simple and expedient fashion.

The circuit diagram shown in FIG. 2 comprises a conventional flip flop similar to that of FIG. 1 and in which like parts have been identified by the same numerals. The drive circuit of FIG. 2 energizes heads 40, 42, 44 or 46 in accordance with the bias levels present on lines 52, 72, 74 and 76, respectively, received from a computer selecting the respective head located on the desired transport for storage of information thereon.

In the specific form illustrated, four tape transports and heads 40, 42, 44 and 46, respectively associated with each of the four transports, are illustrated. It should be noted, of course, that other numbers of transports can be utilized with the circuitry of this invention without departing from the basic spirit and scope thereof. The actual number of transports required for the storage of information from the computer feeding the transports will, of course, vary with a particular installation contemplated. The triggering or selection of the transports by signals from the computer is well known and, therefore, is not illustrated.

In order to use a single write drive circuit to power a selected write head, each head is coupled across the output terminals of the amplifier by a diode coupling, the bias of which is selected in accordance with the desired selection of the head to be energized.

For example, head 40 is coupled across the output terminals 47, 49 by diodes 48 and 50 respectively. The diodes 48 and 50 are biased from a select line bus 52 coupled to terminal 54 through resistors 56 and 58 respectively.

Similarly, heads 42, 44 and 46 are coupled to the same output terminals 47, 49 by diodes 60, 62; 64, 66; 68, 70 biased by buses 72, 74, 76 through resistors 78, 80, 82, 84, 86, 88, respectively.

The voltage applied to the select lines or buses 54, 73, 75 and 77 is derived from a computer (not shown), and the voltage amplitude and polarity are adjusted for selection of the desired head to be activated. For example, if head 40 is to be active for recording of information, the bus 52 is energized with a voltage of −15 volts with respect to ground. Lines 72, 74 and 76 are then energized with +1.5 volts.

The diodes 48 and 50, with such a bias, will pass signals from the amplifier through the head 40 without inserting a high resistance path. On the other hand, the diodes 60 and 62; 64 and 66; 68 and 70 are always back biased during the write operations, providing a high resistance path cutting off any current to the low impedance heads 42, 44 and 46.

Thus, as shown, transistor 10 is fired, clamping the collector to ground, and the terminal 49 will go to 0 volts. The transistor 12 is, thus, cut off, and its collector 18 will go to about −10.5 volts. Thus, current will flow from the collector of the transistor 10 to the head 40 and to the resistor 56. A parallel current will flow through the resistor 58 to ground.

Since the voltage drop through the head is very low, the junction 51 will go negative by a small amount, as for example, one-tenth of a volt. Since the collector 18 is at −10.5 volts, the diode 48 will isolate the collector 18 from the junction 51, preventing the drawing of current through the collector resistor 36 and dropping the collector voltage below the necessary drive voltage for the transistor 10.

As mentioned in connection with FIG. 1, the resistance values and the supply voltage are selected with respect to the coil inductance to provide the necessary drive and current rise time.

Thus, in accordance with this invention, there is provided in simple and expedient fashion, a circuit enabling a single amplifier to be utilized for driving of four heads on a time-sharing basis. This circuit is particularly suitable for computer installations in which the computer receives and transmits information to a plurality of tape transports for magnetic recording of information on each of the transports in a sequence determined by the computer proper.

Thus, a single amplifier can drive heads located on a plurality of tape transports instead of the conventional arrangement of providing each transport with its associated amplifier. Further, the circuit of the invention is suitable for use with computer installations, since the line select function is performed by the computer which must selectively energize one of a plurality of transports by suitable signals to start the tape drives thereon.

This invention may be variously modified and embodied within the scope of the subjoined claims.

What is claimed is:

1. A driver circuit for a low resistance magnetic recording head comprising, first and second terminal means,
a flip flop having a first and second transistor,
each of said transistors having a collector electrode and a collector resistor coupling said collector electrode to a bias source,
a first diode,
a second diode,
each of said diodes having an anode and cathode electrodes,
means coupling the anode of said first diode to the first terminal means of said head,
means coupling said cathode of said first diode to said collector electrode of said first transistor,
means coupling the anode of said second diode to said second terminal means of said head,
means coupling the cathode of said second diode to the collector electrode of said second transistor,
a first resistor coupled between the anode of said first diode and said bias source, and
a second resistor coupled between the anode of said second diode and said bias source.

2. A drive circuit in accordance with claim 1 which includes,
at least one additional head,
a pair of diodes coupling each head across the respective collector electrodes of said flip flop with the cathode electrode of said diode coupled to the respective collector electrode of said flip flop transistor,
a resistor pair,
a bias source for each additional head,
said resistor pair coupling the anode of said diodes in said diode pair to a respective bias source, and
means for selecting the potential and polarity of the bias sources to forward bias the diode pair associated with the selected head and to back bias the diode pairs associated with the nonselected heads.

3. An isolation circuit for energizing a recording head from a transistor flip flop comprising,
a first and second collector electrodes which are selectively and sequentially energized,
a first and second diode,
each of said diodes having a cathode and anode,
means coupling said cathode of said first and second diode respectively to said first and second collectors,
means coupling said head across said anodes of said first and second diodes,
a bias source, and
a first and second resistor coupling said source respectively to the anodes of said first and second diodes.

4. A circuit in accordance with claim 3 in which said first and second resistors are large in comparison to the resistance of said recording head.

References Cited

UNITED STATES PATENTS

| | | | |
|---|---|---|---|
| 3,248,717 | 4/1966 | Mayhew | 346—74 |
| 3,267,482 | 8/1966 | Moore | 307—88.5 |

BERNARD KONICK, *Primary Examiner.*

A. I. NEUSTADT, *Assistant Examiner.*